(12) United States Patent
Nielsen et al.

(10) Patent No.: US 11,871,757 B2
(45) Date of Patent: Jan. 16, 2024

(54) ASSEMBLY AND METHOD FOR PROCESSING POULTRY

(71) Applicant: LINCO FOOD SYSTEMS A/S, Trige (DK)

(72) Inventors: Karsten Nielsen, Trige (DK); Poul Kjeldsen, Trige (DK)

(73) Assignee: LINCO Food Systems A/S, Trige (DK)

( * ) Notice: Subject to any disclaimer, the term of this patent is extended or adjusted under 35 U.S.C. 154(b) by 463 days.

(21) Appl. No.: 16/959,825

(22) PCT Filed: Dec. 14, 2018

(86) PCT No.: PCT/EP2018/085041
§ 371 (c)(1),
(2) Date: Jul. 2, 2020

(87) PCT Pub. No.: WO2019/134809
PCT Pub. Date: Jul. 11, 2019

(65) Prior Publication Data
US 2020/0367517 A1    Nov. 26, 2020

(30) Foreign Application Priority Data

Jan. 3, 2018 (EP) .................................. 18150129

(51) Int. Cl.
*A22B 7/00* (2006.01)
*A22C 21/00* (2006.01)

(52) U.S. Cl.
CPC .......... *A22B 7/001* (2013.01); *A22C 21/0053* (2013.01)

(58) Field of Classification Search
CPC ............................ A22B 7/001; A22C 21/0053

USPC ........................................................ 452/53
See application file for complete search history.

(56) References Cited

U.S. PATENT DOCUMENTS

| 5,605,503 A * | 2/1997 | Martin ............... A22C 21/0061 |
| | | 452/89 |
| 6,093,093 A | 7/2000 | Mostoller et al. |
| 2002/0034565 A1 | 3/2002 | Theodorus van Esbroeck et al. |
| 2003/0019718 A1 | 1/2003 | Draghetti |

(Continued)

FOREIGN PATENT DOCUMENTS

| CN | 1237921 A | 12/1999 |
| CN | 1396101 A | 2/2003 |

(Continued)

OTHER PUBLICATIONS

International Search Report dated Feb. 18, 2019; International Application No. PCT/EP2018/085041.

*Primary Examiner* — Richard T Price, Jr.
(74) *Attorney, Agent, or Firm* — Dinsmore & Shohl LLP

(57) ABSTRACT

An arrangement for processing poultry has at least one overhead conveying device which is designed for conveying the poultry with a predefined conveying speed, which forms a conveyor line and is configured for transporting the poultry suspended by the legs. A plurality of processing stations are arranged along the conveyor line. The conveyor line has processing conveyor portions at each of the processing stations for processing poultry, and at least two of the processing portion lengths of each of the processing conveyor portions are configured to be controlledly variable. A method for processing poultry is also provided.

44 Claims, 5 Drawing Sheets

(56) References Cited

U.S. PATENT DOCUMENTS

| | | | | |
|---|---|---|---|---|
| 2007/0254572 | A1* | 11/2007 | Criscione, II | A22B 3/06 |
| | | | | 452/58 |
| 2013/0052923 | A1 | 2/2013 | Cornelissen et al. | |
| 2016/0152413 | A1* | 6/2016 | Kim | B65G 47/5122 |
| | | | | 198/685 |
| 2017/0172165 | A1* | 6/2017 | Annema | A22C 21/0053 |

FOREIGN PATENT DOCUMENTS

| | | |
|---|---|---|
| CN | 203997774 U | 12/2014 |
| CN | 104286132 A | 1/2015 |
| CN | 105145782 A | 12/2015 |
| CN | 105217234 A | 1/2016 |
| CN | 105645064 A | 6/2016 |
| CN | 205274614 U | 6/2016 |
| JP | 2001169716 A | 6/2001 |
| JP | 2008050155 A | 3/2008 |
| JP | 2011195302 A | 10/2011 |
| KR | 19970000701 | 2/1997 |

* cited by examiner

ASSEMBLY AND METHOD FOR PROCESSING POULTRY

CROSS-REFERENCE TO RELATED APPLICATIONS

This application is a U.S. National Phase of PCT/EP2018/085041 filed Dec. 14, 2018, which claims priority of European Patent Application 18150129.7 filed on Jan. 3, 2018, the contents of both are herewith incorporated by reference into the subject matter of the present patent application.

FIELD OF THE INVENTION

The present invention concerns an arrangement for processing poultry, comprising at least one overhead conveying device which is designed for conveying the poultry with a predefined conveying speed, forms a conveyor line and is configured for transporting the poultry suspended by the legs, a plurality of processing stations arranged along the conveyor line, wherein the conveyor line has processing conveyor portions at each of the processing stations for processing the poultry.

The invention furthermore comprises a method for processing poultry, comprising conveying the poultry with a predefined conveying speed by means of an overhead conveying device which forms a conveying line and is configured to convey the poultry suspended by the legs, wherein a plurality of processing stations is arranged along the conveying line and the conveying line has processing conveying portions at each of the processing stations for processing the poultry.

BACKGROUND OF THE INVENTION

Such arrangements and methods are used in particular in automatic processing of poultry. Usually, the poultry passes through several processing stations, starting from stunning the poultry, slaughtering and bleeding, scalding the poultry for defeathering, gutting and subsequent cooling of the poultry.

In particular, such arrangements and methods are used in compact production installations. These are small production plants, the throughput and conveyor speed of which are predefined accordingly by the operator. Advantageously, these production plants are installed directly on the site of a poultry farm. To obtain optimal production results, it is necessary to set the parameters of the production plant and the individual method steps in advance, and adapt these to the circumstances. An essential operating parameter is the respective holding period of the poultry in each processing station. Usually, it is possible to adapt the holding period to the respective circumstances by changing the respective processing portion lengths in a processing station. This adjustment work is normally performed while the production plant has stopped, i.e. either before production begins or during a production stoppage, and requires manual intervention in the production plant. For this, normally many physical and/or mechanical interventions in the production plant are required, which are associated with corresponding great complexity and thus as a whole are correspondingly time-consuming.

Another possibility for varying the holding period of the poultry in one of the processing stations is to vary the conveyor speed by means of which the poultry are conveyed through the processing stations, and adapt this to the respective circumstances. The disadvantage here is that a change in conveying speed affects the holding period or effective processing duration of the poultry in all processing stations. The change in holding period in one of the processing stations thus necessarily influences the respective holding periods in the other processing stations.

Document US 2007/0254572 A1 describes an apparatus and a method for stunning poultry in which the holding time of the poultry in the stunning apparatus is varied by changing the conveying speed. As already stated, an essential disadvantage of the known apparatus is that varying the holding time of the poultry in the stunning station, because of the change of conveying speed, directly affects all holding periods in the respective downstream processing stations. Also, a change in the holding period of the poultry in the stunning station by changing the conveying speed affects the throughput of the production plant as a whole.

SUMMARY OF THE INVENTION

It is therefore an object of the present invention to propose an arrangement for processing poultry which guarantees optimal parameterisation of the respective processing stations. The object is to provide an arrangement in which the processing stations can be adapted optimally and individually, independently of the other working stations, to the respective production process. The object is furthermore to propose a corresponding method.

This object is achieved by an arrangement with the features cited hereinbefore in that at least two of the processing portion lengths of the processing conveyor portions are configured to be controlledly variable. This offers the advantage that the effective processing portion lengths of the respective processing station are configured so as to be variable in length. The effective processing portion length designates the path length in the corresponding processing conveyor portion along which the poultry interacts with the tools or devices of one of the processing stations. In other words, action is performed on the poultry exclusively in the part portion of the conveyor line defined by the processing portion length. In the remaining partial portions of the conveyor line of the respective processing station, the poultry is conveyed further but there is no interaction of the processing station with the poultry in these partial portions.

The holding period of the poultry in the respective processing station can thus be controlled by variable adaptation of the respective processing portion length independently of the other processing stations. This offers the advantage that each of the respective processing stations can be parameterised optimally. A change in processing portion length does not necessarily mean a corresponding adaptation of the conveying speed. Advantageously, the conveying speed is adapted according to a predefined nominal conveyor speed if the change in one of the processing portion lengths requires this.

A suitable embodiment of the invention is distinguished in that the arrangement comprises a control device which is configured to adjust the processing portion lengths of the processing conveyor portions during operation. In other words, it is possible to adapt the respective processing portion lengths momentarily in real-time by extending or shortening the respective active process transport path which corresponds to the respective processing portion length. Preferably, the control device is part of an overall control system by means of which the entire production process is controlled centrally. In order to achieve the desired product quality, by means of the overall control system all process parameters are predefined and/or adapted to the respective circumstances during operation. In this way for example, process parameters for stunning, bleeding, scalding and defeathering are set. Advantageously, these process parameters are monitored, calculated and constantly controlled, and if necessary adapted immediately, in the overall control system. Such process parameters concern for example electrical voltages, predefined frequencies, gas concentrations, predefined nominal temperatures, desired movement sequences, drive rotation speeds, throughput rates and time settings for the respective processing stations.

This creates the possibility of adjusting the respective process during operation or adapting it to changing production conditions. Thus, for the first time it is possible, in a particularly convenient fashion, to change previously established settings during operation. In other words, the individual process parameters of the respective processing station are functionally linked to those of an upstream or downstream processing station. If for example the processing portion length of an arbitrary processing station is changed, usually it is necessary to adapt the parameterisation of the processing station downstream of this processing station. The present invention for the first time allows this parameterisation of the individual processing stations to be independent of each other and decoupled.

In other words, the present invention allows each process step in the individual processing stations to be set without the change of one of the processing portion lengths affecting the downstream processing stations. Each processing portion length may in this way be controlled individually, independently of the other processing portion lengths.

A preferred development of the invention proposes that the control device is furthermore configured, on a change of one of the processing portion lengths, to adjust the other processing portion lengths on the basis of predefined nominal portion lengths. Advantageously, in this way several processing stations can be adapted to different production conditions. If one of the processing portion lengths is changed by controlled variable intervention by means of the control device, it is advantageous also to adjust the processing portion lengths of further processing stations according to their predefined nominal portion lengths. As a whole therefore, the entire production process can be optimally adapted to the respective circumstances and thus process quality optimised.

According to a further preferred embodiment, the processing stations comprise at least one stunning station for stunning the poultry, a slaughtering station for opening the jugular vein and for bleeding the poultry, and a scalding station for scalding the poultry. Preferably, the processing portion lengths of the above-mentioned processing stations are designed and configured to be controlledly variable, wherein in particular in the region of the slaughtering station, only the conveyor portion which serves for bleeding the poultry has a controlledly variable processing portion length, while the region which serves for opening the jugular vein preferably has a fixed proportion length.

Because of the controlled variability of the above-mentioned processing station, the entire process can be adapted optimally to the respective production conditions. If for example a longer holding period of the poultry in the stunning station is desired, the associated processing portion length can be increased by means of the control device. The longer holding period of the animals in the stunning station leads to a deeper stunning of the animals. This usually means that the animals' hearts stop more quickly. Thus, the time necessary for bleeding is increased, since after opening the jugular vein in the slaughtering station, the bleeding process is no longer supported by the heartbeat, or only for a shorter period. On the basis of the predefined nominal portion lengths for each of the processing portion lengths, the processing portion length of the slaughtering station is adapted by means of the control device and in the present example extended accordingly. The procedure is similar for the further processing stations or their processing portion lengths.

According to a further preferred embodiment of the invention, the overhead conveying device is a rotating continuous conveyor. This offers the advantage that the poultry is conveyed through all said processing stations by means of one and the same continuous conveyor line. Handover and/or buffer stations which would otherwise be necessary, for example to compensate for different conveyor speeds in the individual processing stations, may thus be omitted. Also, the conveying speed is constant or substantially constant and the same in each of the processing stations. To receive the poultry legs, the overhead conveying device has shackles suitable for receiving poultry suspended by the legs.

A further suitable embodiment of the invention is characterised in that the variable length processing portions of the stunning station, the slaughtering station, and/or the scalding station are each formed by at least two deflecting elements, around which a conveying chain of the overhead conveyor runs at least partially, wherein at least one of the deflecting elements is configured so as to be movable for controllable modification of the processing portion length. The deflecting elements thus define the processing portion lengths at one of the processing stations. For controllable change of the respective processing portion length, at least one of the deflecting elements is moved from its original position into a new position relative to the other deflecting element.

By reducing the distance between the deflecting elements, the respective processing portion length is shortened. Accordingly, the processing portion length is extended by increasing the distance between the deflecting elements. The movable deflecting element is moved for example pneumatically, hydraulically or by electric motor. For this, the control device comprises a correspondingly configured control means.

According to a further preferred embodiment of the invention, the overhead conveying device comprises a compensation device which is configured to compensate for a change in the overall length of the conveyor line caused by a change in the processing portion lengths. In this way, the total length of the conveyor line is automatically kept constant on a change in the respective processing portion lengths. This also contributes to the independence of the adjustability of the individual processing portion lengths.

The compensation device has a compensation line, the length of which—referred to below as the compensation line length—corresponds to the sum of the maximum changes of all processing portion lengths. This ensures that any adjustment of the processing portion lengths is reliably compensated by means of the compensation device. Also, by means of the compensation device, a change in chain tension or undesirable sagging of the conveying chain of the overhead conveying device is avoided.

According to a further preferred embodiment, the compensation device comprises a deflecting element configured as a compensation line deflecting element, and thus forms a variable length compensation line for receiving the conveying chain, wherein the compensation line deflecting element is configured so as to be position-variable for controllable change of the compensation line length. In other words, the length of the compensation line is configured so as to be controlledly variable by changing the position of the compensation line deflecting element.

The compensation line element is preferably moved hydraulically, pneumatically or by electric motor by means of the control device, and thus the respective desired position is set. For this, the control device comprises specially configured control means. If one or more of the processing portion lengths changes, preferably the control device ensures that the compensation line element is moved by a distance corresponding to the sum of these line changes, such that the overall conveyor line length remains constant. Advantageously, in this way the respective processing portion lengths can be varied largely arbitrarily and independently of each other. Advantageously, the control device is configured to control the compensation device such that the compensation line length corresponds to the sum of the changes of the processing portion lengths.

A further suitable embodiment of the invention is characterised in that the stunning station, the slaughtering station and the scalding station each have length dimensions which are greater than the respective processing conveyor portions. The respective longest holding period of the poultry in one of the processing stations is achieved if the processing portion length of the respective processing station corresponds to the length dimension of the respective processing station. By shortening the respective processing portion length, the poultry comes into contact with just some of the devices arranged along the processing path of the processing station concerned. In this way, the effective holding period during which action takes place on the poultry is configured to be controlledly variable.

According to a further preferred embodiment, the processing stations comprise a defeathering station for defeathering the poultry, wherein along the processing conveyor portion of the defeathering station, a plurality of defeathering tool groups is arranged which are each configured controllably, such that they come into processing contact with the poultry in predefined contact portions of the processing conveyor portion. The processing portion length and the associated holding period of the poultry in the defeathering station is consequently not varied in by changing the conveyor path to be travelled. The length of the conveyor portion in the defeathering station is thus preferably constant.

A preferred embodiment of the invention proposes that, to change the processing portion length of the defeathering station, the defeathering tool groups are configured so as to be activatable and deactivatable by individual control. The processing portion length of the defeathering station is thus set by the number of defeathering tool groups which are activated or deactivated. The holding period of the poultry, during which it is in the influence range of the activated defeathering tool groups, is in this way configured so as to be adjustable. The necessary defeathering effect is thus achieved depending on requirements.

A further suitable embodiment of the invention is characterised in that to change the processing portion length of the defeathering station, the tool spacing of at least one of the defeathering tool groups is configured to be controlledly variable. A change in processing portion length in the defeathering station is thus achieved in that the tool spacing, i.e. the distance between the respective defeathering tools and the poultry, is configured so as to be controlledly variable. While the defeathering tools with a small tool spacing come into active contact with the poultry and are thus involved in the defeathering process, the tools with the larger tool spacing are not in contact with the poultry and are not therefore involved in the defeathering process. Preferably, the defeathering tools are configured so as to be movable perpendicular to the conveying direction of the poultry.

According to a further preferred embodiment, the processing stations comprise at least one gutting station for removing the internal organs from the poultry, wherein the processing tools are each arranged on a carousel-type tool carrier, and the processing conveyor portion of the conveyor line of the at least one gutting station is accordingly arcuate, wherein the processing portion length is configured so as to be controlledly variable by changing the infeed and/or exit positions of the processing conveyor portion at the carousel-type tool carrier. The change in infeed position and exit position causes the contact points at which the processing tools come into contact with the poultry to shift along the circumference of the carousel-type tool carrier, such that the processing portion length is controlledly variable accordingly.

A further suitable embodiment of the invention is characterised in that the infeed and/or exit positions are configured so as to be controlledly variable by movably configured guiding elements. The guiding elements are preferably driven hydraulically, pneumatically or by electric motor. For this, the control device comprises suitable control elements. By changing the position of the guiding elements, the processing portion length of the gutting station can be controlled variably in a particularly simple and in particular rapid fashion.

A further suitable embodiment of the invention is characterised in that the guiding elements each comprise at least one infeed guiding wheel and at least one exit guiding wheel which are arranged so as to be controllably movable. This offers the advantage that the tools of the carousel-type tool carrier can come into contact with the poultry over as large a contact area as possible, and thus the maximum possible variation in processing portion length is achieved.

Preferably, the conveying chain of the continuous conveying device runs around the carousel-type tool carrier in arcuate fashion over at least 180°. By controlled variation of the position of the infeed guiding wheel and exit guiding wheel, this path can be extended to an angular range of up to 270°. In other words, the processing conveyor portion surrounds the processing tools at the carousel-type tool carrier in arcuate fashion over a contact angle region of at least 180°. Also, advantageously, both the infeed guiding wheel and the exit guiding wheel are configured to increase the contact angle region to a maximum of 270° by controlled movement.

According to a preferred embodiment of the invention, the at least one infeed guiding wheel and the at least one exit guiding wheel are each arranged on the sides of the processing conveyor portion opposite the processing tools. In other words, the infeed and exit guiding wheels are formed as forced guides. The conveying chain of the overhead conveying device is consequently arranged so as to be guided between the carousel-type tool carrier and the infeed and exit guiding wheels.

A further preferred embodiment comprises at least one cooling device for cooling the poultry, wherein the cooling device comprises an entry station for handover of the poultry to a first continuous cooling line, a measuring device for detecting at least one measured parameter relevant for the cooling holding period for the poultry, at least one second continuous cooling line which is connected by means of a transfer station to the first continuous cooling line for controllable handover of the poultry from the first continuous cooling line to the second continuous cooling line, further handover stations arranged on the first continuous cooling line and on the at least second continuous cooling line for controllable handover of the poultry to a further downstream processing station, and a cooling device control system which is configured, on the basis of the measured parameter relevant for the cooling holding period, to determine the necessary cooling conveyor path for each poultry body and activate the transfer station and the further handover stations accordingly so that the respective poultry body passes along the necessary cooling conveyor path. In other words, the control device is configured to switch said continuous cooling lines sequentially and successively according to the necessary processing line length for each slaughtered poultry body. The desired processing line length is controlled by the number of cooling conveyor paths along which a slaughtered poultry body passes.

A further suitable embodiment of the invention is characterised in that the measuring device is a weighing device for detecting the individual weight, and/or a poultry temperature measuring device for detecting the poultry temperature, which are configured to detect the individual weights and/or the poultry temperature as the measured parameter relevant for the cooling holding period. The control device is consequently furthermore configured to set the cooling holding period optimally on the basis of the of individual weights and/or the poultry temperature.

A further suitable embodiment of the invention is characterised in that the conveying speed is at least substantially constant. Preferably, the conveying speed is set to be constant but can be adapted if required, for example for selection of a different throughput rate of the entire installation.

The object is also achieved by a method with the features cited hereinbefore, which is distinguished in that at least two of the processing portion lengths of the processing conveyor portions are adjusted under control.

According to a further preferred embodiment, in each case the processing portion lengths of the processing conveying portions are adjusted by means of a control device during operation.

A further suitable embodiment of the invention is characterised in that on a change of one of the processing portion lengths, the other processing portions lengths are adapted and adjusted by means of the control device on the basis of predefined nominal portion lengths.

According to a further preferred embodiment of the invention, the processing stations comprise at least one stunning station for stunning the poultry, a slaughtering station for opening the jugular vein and for bleeding the poultry, and a scalding station for scalding the poultry.

A further suitable embodiment of the invention is characterised in that the overhead conveying device is a rotating continuous conveyor.

According to a further preferred embodiment, the variable length processing portions of the stunning station, the slaughtering station, and/or the scalding station are each formed by at least two deflecting elements, around which a conveying chain of the overhead conveyor runs at least partially, and at least one of the deflecting elements is moved for controllable modification of the processing portion length.

A further suitable embodiment of the invention is characterised by compensation by means of a compensation device for a change in the overall length of the conveyor line caused by a change in the processing portion lengths.

A further suitable embodiment of the invention is characterised in that the compensation device comprises a deflecting element configured as a compensation line deflecting element, and thus forms a variable length compensation line for receiving the conveying chain, wherein the position of the compensation line deflecting element is varied for controllable change of the compensation line length.

A further preferred embodiment is characterised by control of the compensation device by means of the control device, wherein the control takes place such that the compensation line length corresponds to the sum of the changes of the processing portion lengths.

A further suitable embodiment of the invention is characterised in that the stunning station, the slaughtering station and the scalding station each have length dimensions which are greater than the respective processing conveyor portions.

A further suitable embodiment of the invention is characterised in that the processing stations comprise a defeathering station for defeathering the poultry, wherein along the processing conveyor portion of the defeathering station, a plurality of defeathering tool groups is arranged, wherein the defeathering tools are controlled such that they come into processing contact with the poultry in predefined contact portions of the processing conveyor portion.

According to a further preferred embodiment, to change the processing portion length of the defeathering station, the defeathering tool groups are activated or deactivated by individual preselection by means of the control device.

A further suitable embodiment of the invention is characterised in that to change the processing portion length of the defeathering station, the tool spacing of at least one of the defeathering tool groups is changed by means of the control device.

A further suitable embodiment of the invention is characterised in that the processing stations comprise at least one gutting station for removing the internal organs from the poultry, wherein the processing tools are each arranged on a carousel-type tool carrier, and the processing conveyor portion of the conveyor line of the at least one gutting station is accordingly arcuate, wherein the processing portion length is varied by controlled intervention. A further suitable embodiment of the invention is characterised in that the infeed and/or exit position of the processing conveyor portion on the carousel-type tool carrier is set by means of the control device.

According to a further preferred embodiment, the infeed and/or exit positions are controlled by the control device moving guiding elements.

A further suitable embodiment of the invention is characterised in that the guiding elements each comprise at least one infeed guiding wheel and at least one exit guiding wheel which are arranged so as to be controlledly movable.

A further suitable embodiment of the invention is characterised in that the processing conveyor portion surrounds the processing tools at the carousel-type tool carrier in arcuate fashion over a contact angle region of at least 180°.

According to a further preferred embodiment, the at least one infeed guiding wheel and the at least one exit guiding wheel are each arranged on the sides of the processing conveyor portion opposite the processing tools.

A further suitable embodiment of the invention is characterised in that the contact angle region is increased to a maximum of 270° by controlled movement of the infeed guiding wheel and exit guiding wheel.

A further suitable embodiment of the invention furthermore comprising the steps: cooling of the poultry by means of a cooling device, handover of the poultry by means of an entry station to a first continuous cooling line, detection of at least one measured parameter relevant for the cooling holding period of the poultry by means of a measurement device, wherein the cooling device comprises at least one second continuous cooling line which is connected by means of a transfer station to the first continuous cooling line for controllable handover of the poultry from the first continuous cooling line to the second continuous cooling line, and wherein further handover stations are arranged on the first continuous cooling line and on the least second continuous cooling line for controllable handover of the poultry to a further downstream processing station, and determination of the cooling conveyor path necessary for each poultry body on the basis of the measured parameter relevant for the cooling holding period, and corresponding control of the transfer station and the further handover stations such that the respective poultry body passes along the necessary cooling conveyor path.

According to a further preferred embodiment, as measured parameters relevant for the cooling holding period, individual weights are determined by means of a weighing device and/or the poultry temperature is determined by means of a poultry temperature measuring device.

A further suitable embodiment of the invention is characterised in that the conveying speed is at least substantially constant.

The advantages arising from the method according to the invention and possible embodiments have been described above in detail in connection with the arrangement according to the invention. To avoid repetition, in this context reference is made thereto also in connection with the method according to the invention.

BRIEF DESCRIPTION OF THE DRAWINGS

Further preferred and/or suitable features and embodiments of the invention are provided in the description. Particularly preferred embodiments are explained in more detail with reference to the enclosed drawing.

DETAILED DESCRIPTION OF THE INVENTION

Figure 1:
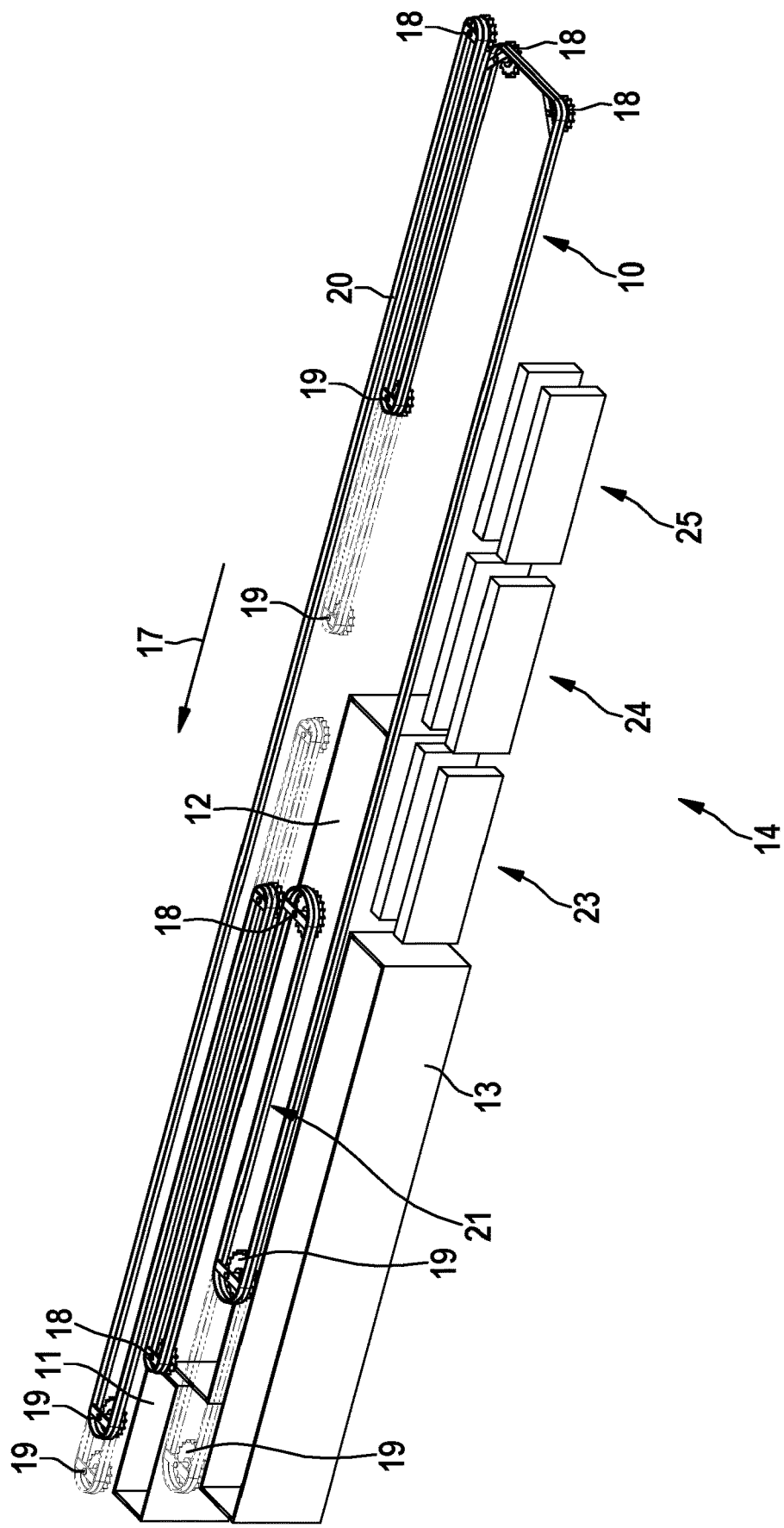
FIG. 1 is a diagrammatic view of an exemplary arrangement according to the invention in perspective view.

FIG. 1 shows as an example a diagrammatic view of an arrangement according to the invention in perspective view. The arrangement according to the invention is designed and configured for processing poultry (not shown in the drawing). It comprises an overhead conveying device 10 which is configured to transport the poultry suspended by the legs.

The overhead conveying device 10 for this preferably comprises shackles for receiving the poultry legs. The overhead conveying device 10 is furthermore configured to transport the poultry in the conveying direction 17 with a predefined conveying speed. Preferably, the transport takes place with an at least substantially constant conveying speed. An at least substantially constant conveying speed means that the conveying speed is either constant or deviates only slightly from this constant value.

The overhead conveying device 10 forms a conveying line along which a plurality of processing stations is arranged. These processing stations, as shown as an example in FIG. 1, comprise for example a stunning station 11, a slaughtering station 12, a scalding station 13 and a defeathering station 14. The processing stations may also comprise gutting stations 15 (not shown in FIG. 1) and cooling devices 16. The number of said processing stations is variable and not restricted to the number indicated in the above-mentioned example. Rather, the exact number of respective processing stations depends on the plant and production criteria.

A processing conveyor portion is assigned to each of the processing stations. In other words, the conveyor line has corresponding processing conveyor portions at each of the processing stations, which allow processing of the poultry or action thereon.

According to the invention, at least two processing portion lengths of the processing conveyor portions are designed so as to be controlledly variable. In this way, it is possible to set the processing or action time at the respective processing station variably. The production process can thus be adapted to a plurality of different production circumstances in a simple and convenient fashion. Thus, for example special requirements and regulations apply to each production country, production region and or respective poultry farm. Further preferably, more than two processing portion lengths of the processing conveyor portions are configured so as to be controlledly variable.

By controlled variation of the respective processing portion lengths, the respective processing periods can be controlled and adjusted variably. An essential advantage of the present invention is that, on the one hand, these processing periods can be changed at the respective processing stations, but on the other hand, the conveyor speed is independent of such variations in the respective processing periods. This means that the conveyor speed of the overhead conveying device 10 is kept constant on a change in respective processing periods. Thus for example a variation in the holding period of the poultry in the stunning station 11, because of the constant conveyor speed, does not lead to a change in the holding period in one of the further processing stations downstream of the stunning station 11, such as for example the slaughtering station 12, the scalding station 13 or the defeathering station 14.

According to the invention, the respective holding period of the poultry at one of the processing stations can be adjusted by controlled variation, individually and independently of the other processing stations. The resulting flexibility in the production process is explained in more detail as an example with reference to the table below.

|  | 1 | 2 | 3 | 4 | 5 |
|---|---|---|---|---|---|
| Stunning station | 3 sec. | 4 sec. | 5 sec. | 7 sec. | 9 sec. |
| Slaughtering station | 120 sec. | 150 sec. | 180 sec. | 210 sec. | 240 sec. |

|  | 1 | 2 | 3 | 4 | 5 |
| --- | --- | --- | --- | --- | --- |
| Scalding station | 60 sec. | 90 sec. | 120 sec. | 150 sec. | 180 sec. |
| Defeathering station | 30 sec. | 35 sec. | 40 sec. | 45 sec. | 50 sec. |

The table shows as an example different holding periods of the poultry in the respective processing stations. Columns 1 to 5 indicate the respective holding periods in seconds. Column 3 shows for example a possible default setting. Thus, the holding period of the poultry in the stunning station is 5 seconds, in the slaughtering station 180 seconds, in the scalding station 120 seconds and in the defeathering station 40 seconds. Taking into account the desired conveying speed of the overhead conveying device 10, the respective processing portion lengths of the processing conveying portions are set under control such that the holding periods of the poultry given in column 3 are achieved in each of the processing stations. By controlledly variable changing of the respective processing portion lengths of the processing conveying portions, it is possible to set arbitrary holding period combinations.

Advantageously, the arrangement according to the invention comprises a control device (not shown in the drawing) which is configured to adjust the respective processing portion lengths of the processing conveying portions during operation. In other words, the control device is configured to adapt the process transport path active at one of the processing stations to the respective circumstances as required, in real-time during ongoing production, by lengthening or shortening. In this way, it is possible, while maintaining ongoing production, to adapt the processing portion lengths and hence the corresponding holding and processing periods dynamically.

The control device is furthermore configured, on a change in one of the processing portion lengths, to adjust at least one or all of the other processing portion lengths on the basis of predefined nominal portion lengths. The function of the control device or method according to the invention will be explained in more detail in the following example.

If for example in poultry processing, a higher stunning level of the birds in the stunning station 11 is required, as required for example in EU directive (EC) No. 1099/2009, this higher stunning level leads to an earlier heart stoppage of the birds. Because of the lack of heartbeat, the necessary time for bleeding is extended accordingly. Therefore, the holding period of the birds in the slaughtering station 12 must be extended accordingly. The control device is therefore configured to adapt the processing portion length of the slaughtering station 12 according to a nominal portion length predefined for this.

A further consequence is that, frequently, the scalding time and/or the necessary scalding temperature must be increased in order to achieve the desired production quality. The extended bleeding time and scalding time normally have a negative effect on the defeathering performance in the defeathering station 14. Here again, consequently the processing duration must be adapted accordingly, which is achieved using the duly configured control device on the basis of the predefined nominal portion length.

The slaughtering station 12, on the one hand, comprises means for opening the jugular vein and, on the other hand, means for bleeding the poultry. Preferably, the part of the processing portion length of the slaughtering station 12 configured for opening the jugular vein is of invariable length, while the processing portion length for bleeding the poultry is configured to be controlledly variable.

Figure 2:
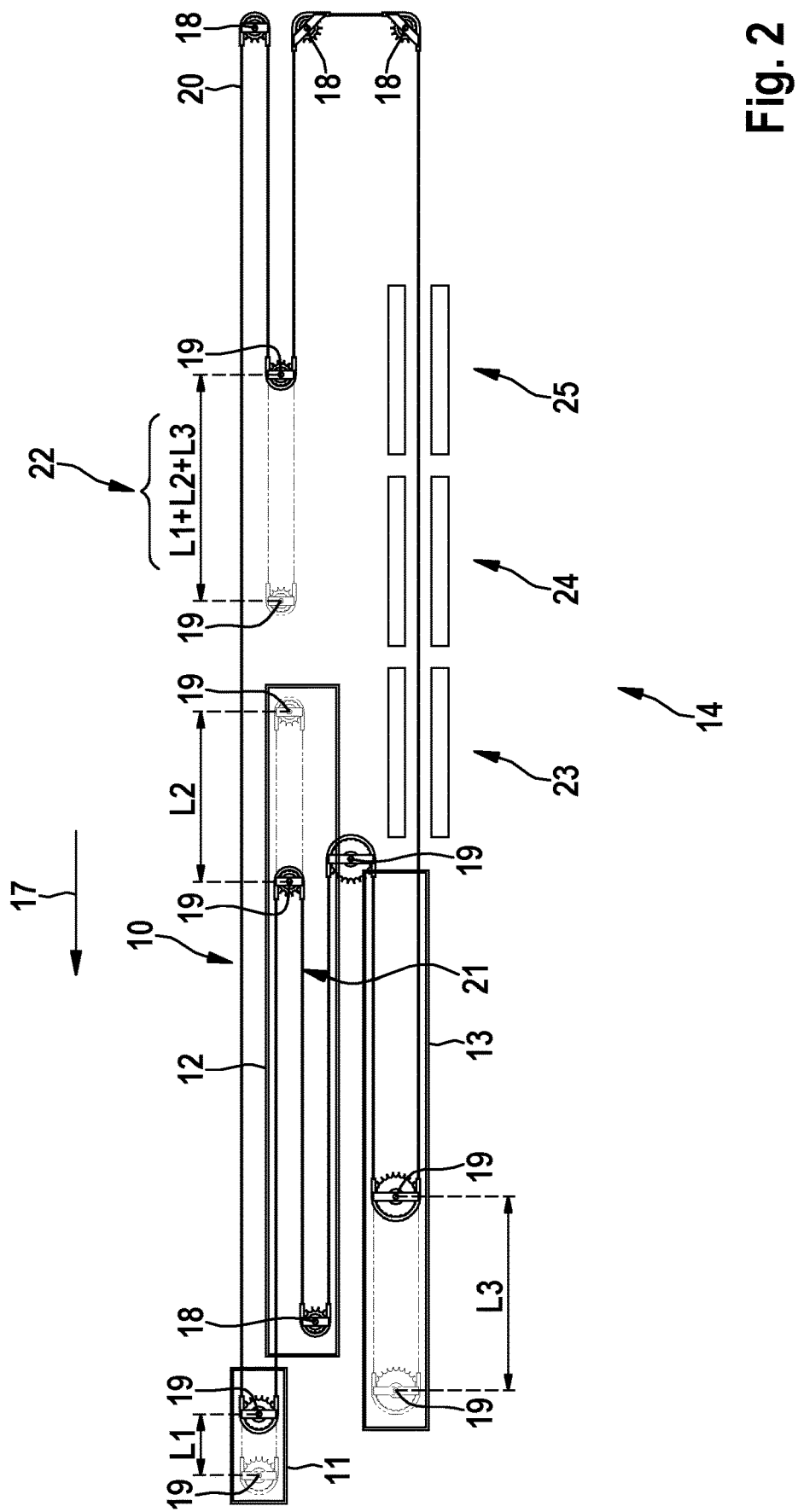
FIG. 2 is a top view of the arrangement shown in FIG. 1.

As shown in FIGS. 1 and 2, the overhead conveying device 10 is preferably configured as a rotating continuous conveyor. The continuous conveyor is guided by means of a plurality of conveying elements 18, and driven by some of the conveying elements 18. The conveying elements 18 are preferably arranged stationarily.

At least the variable length portions of the stunning station 11, slaughtering station 12 and/or scalding station 13 are formed each by at least two deflecting elements 19. A conveying chain 20 of the overhead conveyor runs at least partially around the respective deflecting elements 19. Preferably, the conveying chain surrounds each of the deflecting elements 19 in semicircular fashion, i.e. forms a 180° deflection. At least one of the deflecting elements 19 is configured movably for controllable change of processing portion length. The respective deflecting element 19 is therefore not stationary, but preferably configured so as to be controlledly movable in or opposite the conveying direction 17.

As already mentioned hereinbefore, the slaughtering station 12 comprises two portions, namely one with constant processing portion length for opening the jugular vein, and a bleeding section 21 with variable processing portion length. To change the processing portion length, the deflecting elements 19 are moved into the required position by means of electrical or hydraulic drive.

Advantageously, the overhead conveying device comprises a compensation device 22 which is configured to compensate for a change in the overall length of the conveyor line resulting from a change in processing portion lengths. For this, the compensation device 22 comprises at least one conveying element 18 and at least one of the deflecting elements 19. FIG. 2 shows as an example the function in principle of the compensation device 22.

If the respective processing portion lengths are shortened by moving the respective deflecting elements 19, the deflecting element 19 of the compensation device 22 is moved such that the shortening of the conveying chain occurring in the respective processing stations is compensated accordingly. If for example the processing portion length in the stunning station 11 is shortened by length L1, the processing portion length in the bleeding section 21 of the slaughtering station 12 is shortened by length L2, and the processing portion length of the scalding station 13 is shortened by length L3, the deflecting element 19 of the compensation device 22 is moved by a length which corresponds to the sum of lengths L1, L2 and L3.

The movement direction of the deflecting element 19 of the compensation device 22 is here selected such that the total length of the conveying line remains constant or substantially constant. Insofar as, by a change in the respective processing portion lengths of the processing stations as a whole, there is no change in the overall conveyor line length, there is no need for compensation of the conveyor line length by means of the compensation device 22.

The compensation device 22 thus forms a variable length compensation line for receiving the conveying chain. The conveying element 18 and the deflecting element 19 of the compensation device 22 form two compensation line deflecting elements, the mutual spacing of which determines the length of the variable length compensation line. For controllable change of the compensation line length, at least one of the compensation line deflecting elements is configured to be variable in position, for example—as shown in FIG. 2—the deflecting element 19 of the compensation device 22. The control device is designed and configured accordingly for controllable change of the compensation line length.

It is preferably provided that the control device controls the compensation device 22 such that the compensation line length corresponds to the sum of the change of the processing portion lengths of the respective processing stations.

Advantageously, the length dimensions of the respective processing conveying portions of the stunning station 11, the slaughtering station 12 and the scalding station 13, are each greater than the respective processing portion lengths. The processing conveying portions here designate those parts of the conveyor line along which the respective processing station extends and intervention on the poultry by means of the respective processing station takes place. By the change described above in the respective processing portion length, the respective holding time in one of the processing stations can be adapted in a controllably variable fashion.

The defeathering station 14 comprises a plurality of defeathering tool groups 23, 24, 25. Each of the defeathering tool groups 23, 24, 25 is configured controllably such that they come into processing contact with the poultry in predefined cycle portions of the processing conveyor portion. In FIGS. 1 and 2 for example, three of the defeathering tool groups 23, 24, 25 are shown which are arranged successively along the conveyor line.

To control the active processing portion length of the defeathering station 14, the control device variably sets the number of defeathering tool groups 23, 24, 25 coming into processing contact with the poultry. Preferably, for this the defeathering tool groups 23, 24, 25 are configured to be activatable and de-activatable by individual control. If only a comparatively short processing portion length of the defeathering station 14 is required, by means of the control device only one of the defeathering tool groups 23, 24, 25 is activated and comes into processing contact with the poultry. The other defeathering tool groups 23, 24, 25 are de-activated and do not come into contact with the poultry. Depending on the predefined nominal portion length for the defeathering station 14, the control device also in some cases engages further of the defeathering tool groups 23, 24, 25, in order to adapt the processing portion length of the defeathering station 14 to the nominal length.

Alternatively, it is possible to change the tool spacing of at least one of the defeathering tool groups 23, 24, 25 by means of the control device. For this, the defeathering tool groups are configured accordingly so as to be controllably variable. In other words, the distance of the defeathering tool groups 23, 24, 25 from the conveyor line is configured to be variable. To set the desired processing portion length, the tool spacing of at least some of the defeathering tool groups 23, 24, 25 is set such that, along the predefined processing portion length, a corresponding number of defeathering tools is arranged in the action region of the poultry. The tools of the defeathering tool groups 23, 24, 25 which are not required because of the predefined nominal portion length, are positioned so that they maintain a tool distance from the conveyor line which is sufficiently large to securely exclude interaction of the defeathering tools with the poultry.

Alternatively, it is provided that the conveying speed of the conveying device 17 can be adapted according to the desired holding period of the poultry in the defeathering station 14. The holding period of the poultry corresponds to a predefined nominal portion length which must be observed in the defeathering process. If for example it is desired to increase the nominal portion length of the defeathering station 14 and hence the holding period of the poultry in the defeathering station 14, by means of the control device the conveying speed of the overhead conveying device 10 is reduced accordingly in order to achieve the desired holding period. If a shorter holding period in the defeathering station 14 is desired, the conveying speed is increased accordingly.

In order to compensate for the reduced or increased conveying speed of the overhead conveying device 10 in the upstream processing stations, namely the stunning station 11, the slaughtering station 12 and the scalding station 13, the control device is configured to adapt the respective processing portion lengths of the above-mentioned processing stations accordingly. In this way, it is ensured that the respective holding periods of the poultry in the stunning station 11, the slaughtering station 12 and the scalding station 13 remain constant despite a change in conveying speed. Thus, it is possible to make adjustments to the defeathering station which entail a change in conveying speed without influencing the processes taking place in the stunning station 11, slaughtering station 12 and/or scalding station 13.

Preferably, the processing stations comprise at least one gutting station 15. The gutting stations are configured to remove the internal organs of the poultry. For this, processing tools configured for gutting the poultry are arranged on a carousel-type tool carrier 26. The associated processing conveyor portions are correspondingly arcuate.

Figure 3:
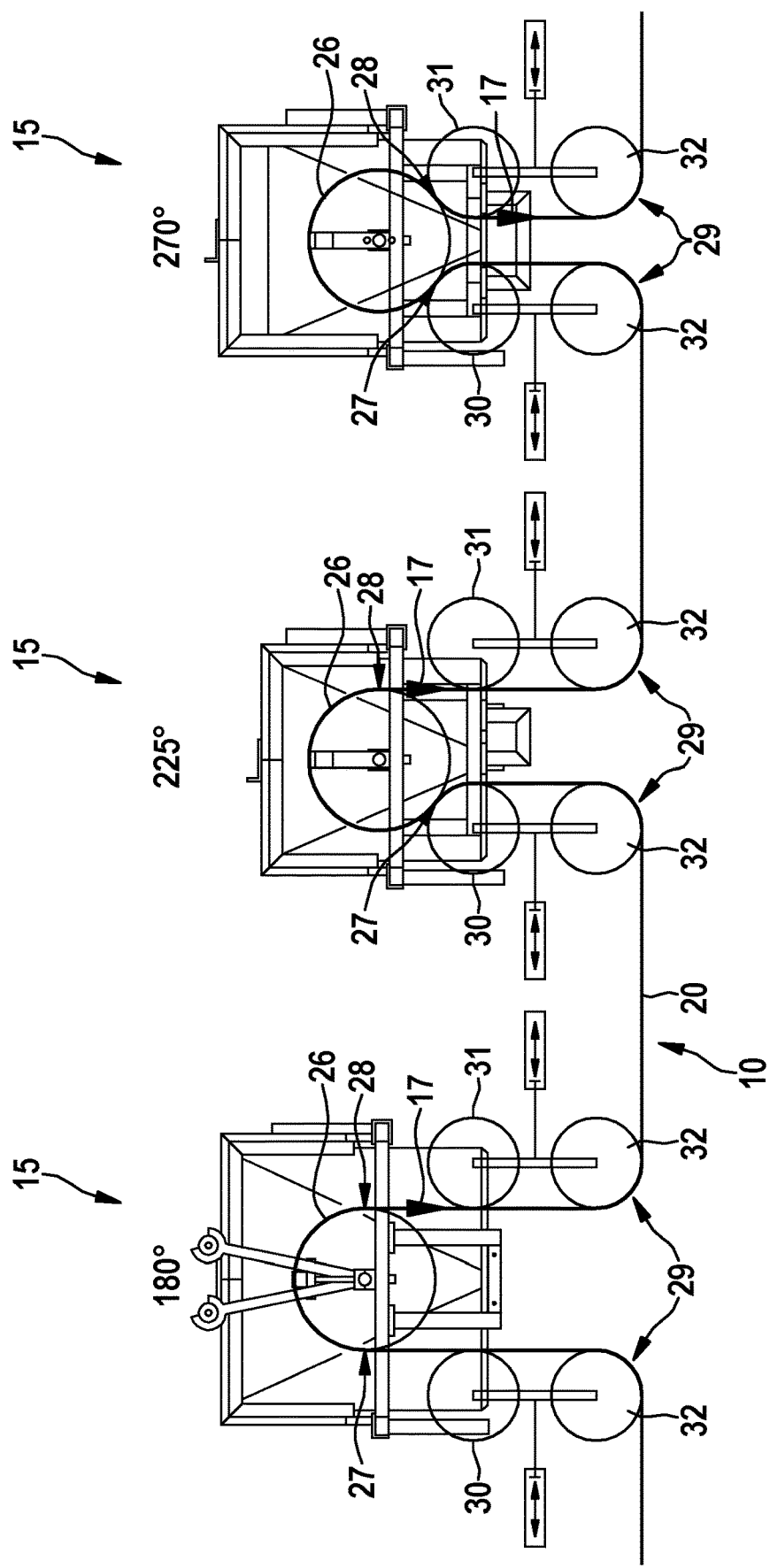
FIG. 3 is a diagrammatic depiction of several processing stations configured as carousels.

In FIG. 3, several processing stations configured as carousels are shown as an example in a sequential arrangement. The respective processing portion length is configured to be controlledly variable by change of the infeed position 27 and/or the exit position 28 on the respective carousel-type tool carrier 26.

The gutting stations 15 shown in FIG. 3 each have operating states with different processing portion lengths. At the gutting station 15 shown on the left, the conveyor line runs around the carousel type tool carrier 26 in a 180° arc. The processing portion length consequently corresponds to the length of the arcuate conveyor line with a centre point angle of 180°. The arc length and hence the respective processing portion length is determined by the infeed position 27 and the exit position 28. As shown in FIG. 3, the infeed position 27 is at 9 o'clock (9:00) while the exit position 28 is at 3 o'clock (3:00). In this way, the poultry comes into contact with the gutting tools (not shown in the drawing) along a 180° curve around the carousel-type tool carrier 26.

The middle gutting station shown in FIG. 3, like the left gutting station 15, has an exit position 28 at 3 o'clock (3:00). The infeed position 27 however is at 7:30, so that the poultry to be gutted travels along a 225° arcuate portion. The processing portion length of the middle gutting station 15 thus corresponds to the length of an arc with a centre point angle of 225°.

The right gutting station 15 shown as an example in FIG. 3 has an infeed position 27 at 7:30 and an exit position 28 at 4:30. The poultry thus travels around the carousel-type tool carrier 26 along a 270° arc.

The infeed and exit positions 27, 28 shown in FIG. 3 and the associated centre point angles of 180°, 225° and 270° serve exclusively to illustrate the present invention. This is evidently not restricted to the processing portion lengths shown in FIG. 3. Rather, it is possible, by varying the infeed and/or exit positions 27, 28, to select the processing portion lengths continuously so that the arcuate course of the conveyor line around the respective carousel-type tool carrier may have any arbitrary centre point angle between 180° and 270°.

As shown in FIG. 3, the gutting stations 15 each comprise guiding elements 29. The guiding elements 29 are configured movably so that the infeed and/or exit position 27, 28 is controlledly variable. By changing the position of the guiding element 29 shown on the left in FIG. 3, the respective infeed position 27 is controlled. To change the exit position 28, the guiding elements 29 arranged on the right in FIG. 3 next to the gutting stations 15 are moved under control. For this, the control device comprises suitable actuation means.

The guiding elements 29 preferably each comprise at least one infeed guiding wheel 30 and at least one exit guiding wheel 31. The infeed guiding wheel 30 and the exit guiding wheel 31, as parts of the guiding elements 29, are also arranged to be controlledly movable. The infeed guiding wheels 30 and the exit guiding wheels 31 are configured as counter-bearing elements, and designed to guide the conveying chain 30 at the carousel-type tool carrier 26.

The processing conveyor portion surrounds the processing tools at the respective carousel-type tool carrier 26 in a contact angle region of at least 180° in arcuate fashion. A 180° middle point angle, as stated above, is shown in FIG. 3 at the left gutting station 15. Larger angles are shown as 225° at the middle gutting station and 270° at the right gutting station 15. Depending on the selected diameter of the infeed and exit guiding wheels 30, 31, the middle point angle or contact angle region may also comprise angles greater than 270°.

Preferably, the guiding elements 29 additionally comprise deflecting wheels 32, using which the conveying chain 20 is deflected in particular by 90°. In order to fulfil the function of the infeed guiding wheels 30 and exit guiding wheels 31 as counter-bearing elements, these are preferably each arranged on the sides of the processing conveyor portion lying opposite the processing tools. In other words, the conveyor line runs between the guiding elements 29 and the carousel-type tool carriers 26; the carousel-type tool carriers 26 and the guiding elements 29 are consequently arranged opposite each other relative to the conveying chain 20. Furthermore preferably, both the infeed guiding wheel 30 and the exit guiding wheel 31 are configured, by controlled movement, to increase the contact angle region to a maximum of 270°.

For simplification, FIG. 3 shows only three of the gutting stations 15 as examples. The gutting station 15 shown on the left is formed as a cloaca cutter, the middle one as an opening unit, and the right-hand one as an extractor for removing the internal organs. Advantageously, further gutting stations 15 (not shown in the drawing) are provided, for example a neck extractor for detaching the internal organs lying in the neck region, a neck breaker, an inspection station for checking the preceding processing steps, and a washer for cleaning the resulting slaughtered poultry bodies. By means of said gutting stations, the poultry is processed such that it leaves the last gutting station 15 arranged downstream relative to the conveying direction 17 in oven-ready state.

The table below shows various predefined holding periods or processing periods as examples, which result from the respective processing portion lengths set by means of the control device.

|  | 1 | 2 | 3 |
|---|---|---|---|
| Cloaca cutter | 8 sec. | 10 sec. | 12 sec. |
| Opening unit | 6 sec. | 7 sec. | 8 sec. |
| Extractor | 11 sec. | 14 sec. | 17 sec. |
| Neck extractor | 11 sec. | 14 sec. | 17 sec. |
| Neck breaker | 8 sec. | 10 sec. | 12 sec. |
| Inspection station | 8 sec. | 10 sec. | 12 sec. |
| Washer | 8 sec. | 10 sec. | 12 sec. |

Further preferably, the arrangement according to the invention comprises at least one cooling device 33. Since the method according to the invention, similarly to the arrangement, also comprises the step of cooling the poultry by means of the cooling device 33, to avoid repetition the description below discusses substantially the arrangement according to the invention. The statements below concerning the arrangement however apply equally to the method according to the invention.

Figure 4:
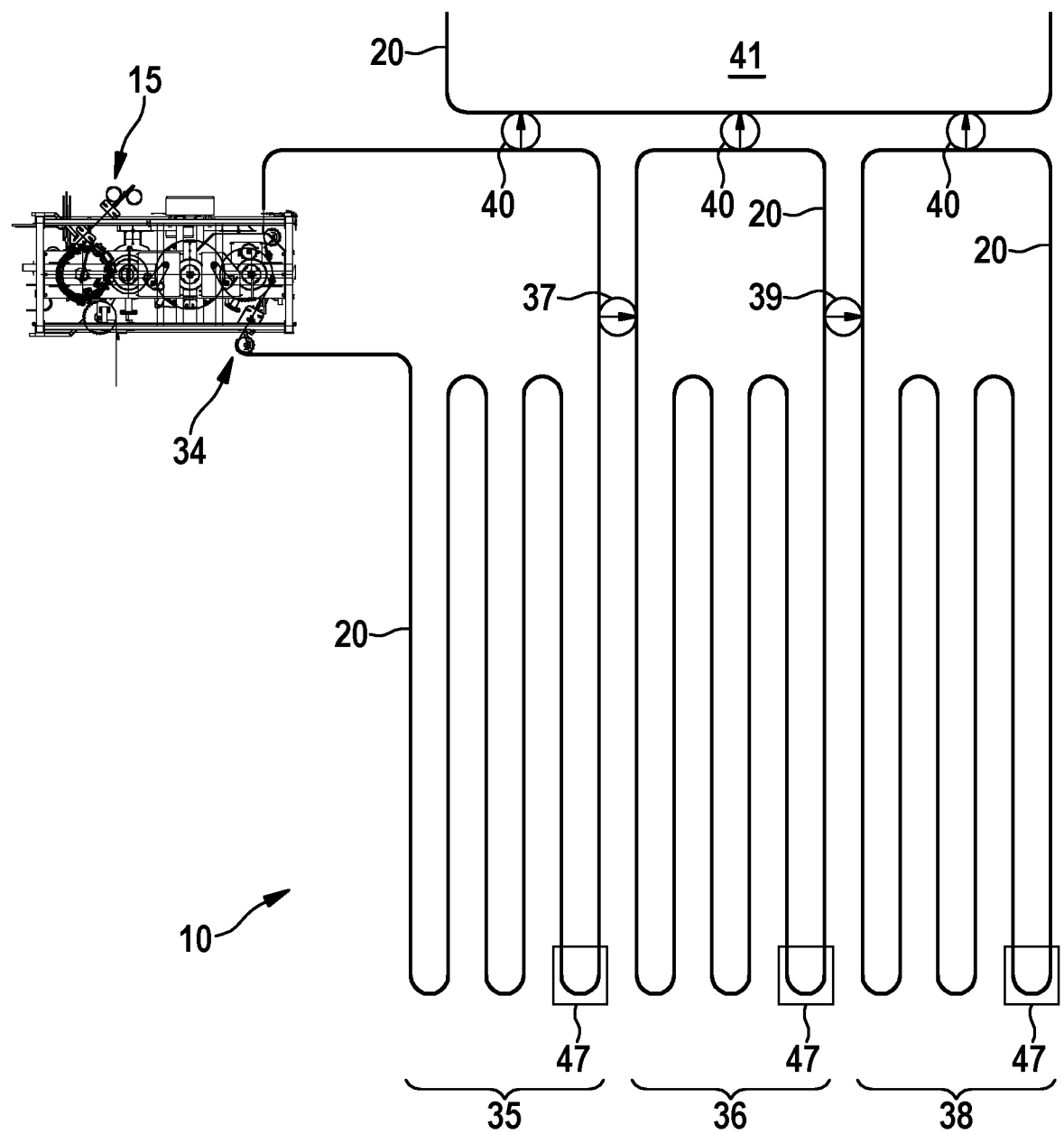
FIG. 4 is a top view of an exemplary embodiment of a cooling device.

FIG. 4 shows an exemplary embodiment of the cooling device 33 in top view. The cooling device 33 comprises an entry station 34 which is designed and configured to deliver the poultry to a first continuous cooling line 35. The entry station 34 is for example part of the gutting station 15, so that after gutting, the poultry reach the first continuous cooling line 35 via the entry station 34. The cooling device 33 furthermore comprises a measuring device (not shown in FIG. 4) for detecting at least one measured parameter relevant for the cooling holding period of the poultry. Furthermore, at least one second continuous cooling line 36 is provided, which is connected by means of a first transfer station 37 to the first continuous cooling line 35 for controllable handover of the poultry from the first continuous cooling line 35. The number of continuous cooling lines depends on the required cooling performance in conjunction with the desired poultry throughput rates. As FIG. 4 shows, optionally a third continuous cooling line 38 may be arranged after the second continuous cooling line 36. The controlled selective handover of individual slaughtered poultry bodies takes place via a second transfer station 39 which is arranged between the second continuous cooling line 36 and the third continuous cooling line 38. The transfer stations 37 and 39 are connected to the control device accordingly. For handover of the poultry to a further downstream processing station 41, which is configured for example for sorting and distributing the poultry, further handover stations 40 are arranged at the respective continuous cooling lines 35, 36, 38 for controllable handover of the poultry.

By means of a cooling device control system which is for example part of the control device, the necessary cooling conveyor path for each poultry body is determined on the basis of determined measured parameters relevant for the cooling holding period. On the basis of the determined necessary cooling conveyor path, the first transfer station 37, the second transfer station 39 and where applicable the further handover stations 40 are activated such that each of the poultry bodies passes along the previously determined necessary cooling path. In this way it is possible to keep the slaughtered poultry bodies in the cooling process individually until the desired cooling state is reached.

The measured parameters relevant for the cooling holding period of the poultry are at least the weight of the slaughtered poultry body and its temperature, in particular its deep muscle temperature. For this, the measuring device preferably comprises a weighing device for detecting the individual weights of the slaughtered poultry bodies and/or a poultry temperature measuring device 47 for determining the poultry temperature. On the basis of the poultry weight and the poultry temperature, the cooling device control system determines, from predefined cooling specifications, the respective cooling holding period for each individual slaughtered poultry body.

By means of the poultry temperature measuring devices 47, it is checked whether the slaughtered poultry bodies have reached the predefined nominal temperature and can be handed over by means of the further handover stations 40 to the downstream processing stations 41, i.e. for example the distribution line 42. If the measured temperature lies above the nominal value, the slaughtered poultry bodies are handed over by means of the first transfer station 37 to the second continuous cooling line 36, and if necessary to the third continuous cooling line 38, in order to reach the desired nominal temperature. In many countries, a nominal temperature to be reached is prescribed, so that the poultry temperature measuring devices 47 advantageously not only provide the control device with a measured parameter relevant for the cooling holding period of the poultry, but also are evaluated for quality control of the entire cooling process.

Further parameters, in addition to said values, may be used as output values for determining the necessary cooling holding period. For example, the poultry temperature is measured periodically during the cooling process, or initially at or before handover of the poultry by means of the entry station 34 to the first continuous cooling line 35. In addition, further parameters may be used to determine the necessary cooling holding period, for example the bird body volume, the ambient temperature at the preceding processing steps, and other parameters which affect the necessary cooling holding period. Thus it is possible for example, on the basis of the determined weight and the deep muscle temperature present at handover to the first continuous cooling line 35, to determine in advance the required cooling holding period for each slaughtered poultry body. On the basis of this determined cooling holding period, the cooling device control system causes the respective transfer station 37, 39 and at least one of the further handover stations 40 to arrange the corresponding handover of the slaughtered poultry body in order to perform the desired cooling process according to the specifications. Alternatively or additionally, it is proposed to determine the tissue temperature of the slaughtered poultry body, reached after passing through one of the continuous cooling lines 35, 36, 38, and decide by comparison with the specifications whether the respective poultry body should be transferred to a downstream continuous cooling line or transferred to the downstream processing station 41 by means of the further handover stations 40.

The table below shows as an example various cooling holding periods with the respective poultry temperature achieved on passing through a corresponding number of continuous cooling lines.

|  | Cooling line 1 | Cooling line 1 + 2 | Cooling line 1 + 2 + 3 |
|---|---|---|---|
| Cooling period | 30 min. | 60 min. | 90 min. |
| Poultry temperature | 6° C. | 4° C. | 2° C. |

In particular, it is provided that the conveyor speed is constant or substantially constant. For this, the control device is configured such that as a central nominal value, a predetermined conveyor speed is preselected, depending on which—where necessary—the respective processing portion lengths are adapted as described above. This avoids a mutual influencing of the individual processing steps.

Figure 5:
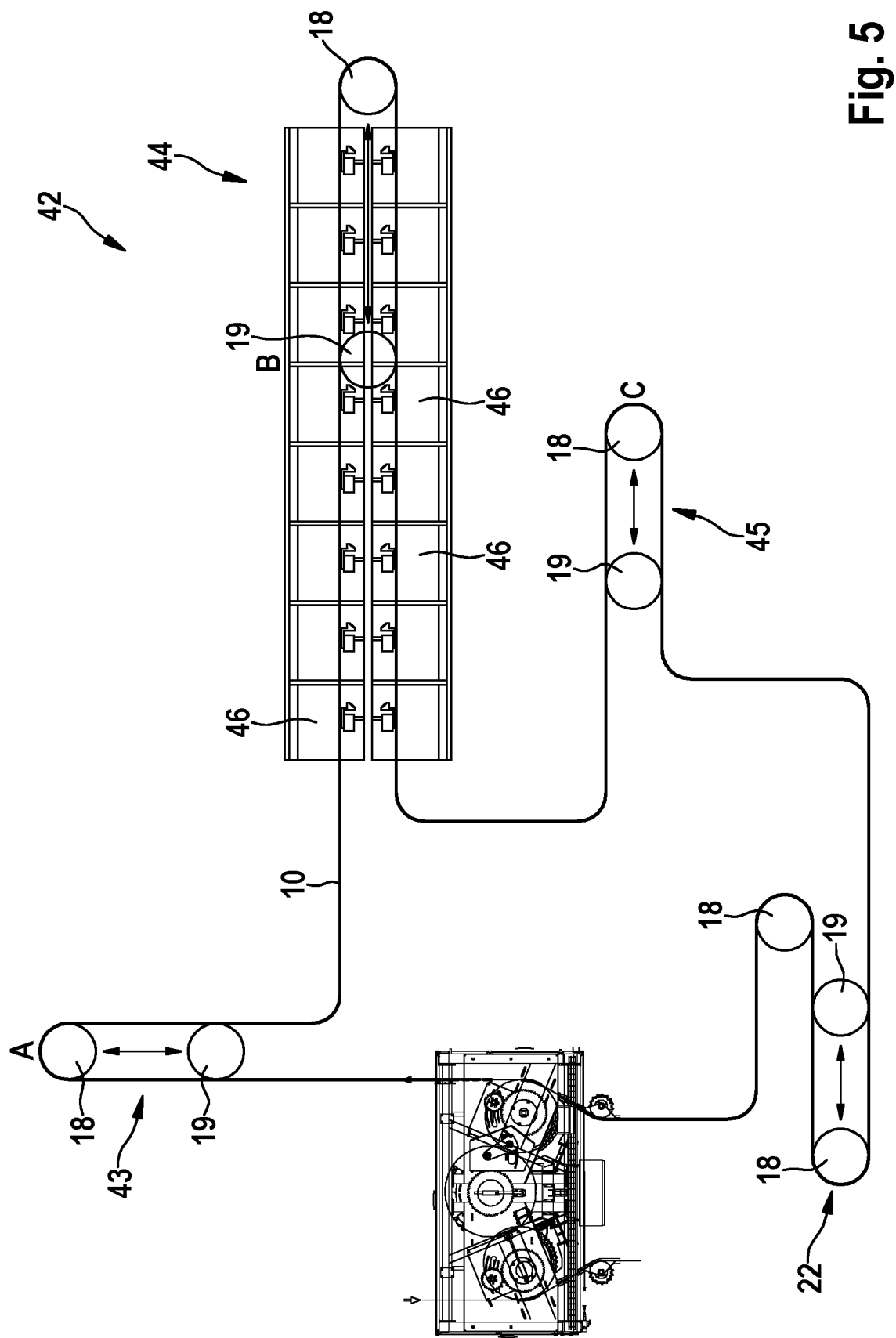
FIG. 5 is an exemplary diagrammatic depiction of a distribution line.

FIG. 5 shows as an example a distribution line 42. By means of the distribution line 42, the poultry are distributed according to predefined criteria, in particular weight. The distribution line 42 comprises for example a first output station 43, a second output station 44 and a third output station 45.

The respective portion lengths along which the poultry are removed from the overhead conveying device and transferred to the selected output positions are configured to be adjustable with controlled variation by means of the control device.

Possible handover positions are designated in FIG. 5 with letters A, B, and C. If for example handover takes place at handover stations A and C, by means of the control device the processing portion length of the second output station 44 is shortened accordingly, so that the slaughtered poultry bodies are handed over only for example in 16 handover regions 46.

If there is no handover at handover positions A and B, by means of the control device the processing portion length of the second output station 44 is extended accordingly, so that for example handover takes place at 24 or 32 of the handover regions 46.

To avoid repetition, with regard to the method according to the invention, reference is made to the statements made above in connection with the arrangement according to the invention. The method steps according to the invention arise accordingly from the description of the figures.

The invention claimed is:

1. An arrangement for processing poultry, comprising:
   at least one overhead conveying device which is designed for conveying the poultry with a predefined conveying speed, the at least one overhead conveying device forming a conveyor line and being configured for transporting the poultry suspended by legs of the poultry;
   a plurality of processing stations arranged along the conveyor line;
   the conveyor line having processing conveyor portions at each of the processing stations for processing the poultry,
   at least two processing portion lengths of each of the processing conveyor portions being configured to be controlledly variable.

2. The arrangement according to claim 1, further comprising a control device which is configured to adjust the processing portion lengths of the processing conveyor portions during operation.

3. The arrangement according to claim 2, wherein the control device is furthermore configured, on a change of one of the processing portion lengths, to adjust the other processing portion lengths on the basis of predefined nominal portion lengths.

4. The arrangement according to claim 3, wherein the plurality of processing stations comprise at least one stunning station for stunning the poultry, a slaughtering station for opening a jugular vein and for bleeding the poultry, and a scalding station for scalding the poultry.

5. The arrangement according to claim 4, wherein the overhead conveying device is a rotating continuous conveyor.

6. The arrangement according to claim 5, wherein the variable length processing portions of the stunning station, the slaughtering station, and/or the scalding station are each formed by at least two deflecting elements, around which a conveying chain of the overhead conveyor runs at least partially, wherein at least one of the deflecting elements is configured so as to be movable for controllable modification of the processing portion length.

7. The arrangement according to claim 6, wherein the overhead conveying device further comprises a compensation device which is configured to compensate for a change in an overall length of the conveyor line caused by a change in the processing portion lengths.

8. The arrangement according to claim 7, wherein the compensation device comprises a deflecting element configured as a compensation line deflecting element and thus forms a variable length compensation line for receiving the conveying chain, wherein the compensation line deflecting element is configured so as to be position-variable for controllable change of the compensation line length.

9. The arrangement according to claim 8, wherein the control device is configured to control the compensation device such that the compensation line length corresponds to a sum of the changes of the processing portion lengths.

10. The arrangement according to claim 4, wherein the stunning station, the slaughtering station and the scalding station each have length dimensions which are greater than the respective processing conveyor portions.

11. The arrangement according to claim 1, wherein the processing stations comprise a defeathering station for defeathering the poultry, wherein along the processing conveyor portion of the defeathering station, a plurality of defeathering tool groups is arranged which are each configured controllably such that they come into processing contact with the poultry in predefined contact portions of the processing conveyor portion.

12. The arrangement according to claim 11, wherein to change the processing portion length of the defeathering station, the defeathering tool groups are configured so as to be activatable and deactivatable by individual control.

13. The arrangement according to claim 11, wherein to change the processing portion length of the defeathering station, a tool spacing of at least one of the defeathering tool groups is configured to be controlledly variable.

14. The arrangement according to claim 1, wherein the plurality of processing stations comprise at least one gutting station for removing internal organs from the poultry, further comprising processing tools each arranged on a carousel-type tool carrier, and the processing conveyor portion of the conveyor line of the at least one gutting station is accordingly arcuate, wherein the processing portion length is configured so as to be controllably variable by changing infeed and/or exit positions of the processing conveyor portion at the carousel-type tool carrier.

15. The arrangement according to claim 14, wherein the infeed and/or exit positions are configured so as to be controlledly variable by movably configured guiding elements.

16. The arrangement according to claim 15, wherein the guiding elements each comprise at least one infeed guiding wheel and at least one exit guiding wheel which are arranged so as to be controlledly movable.

17. The arrangement according to claim 16, wherein the processing conveyor portion surrounds the processing tools at the carousel-type tool carrier in arcuate fashion over a contact angle region of at least 180°.

18. The arrangement according to claim 17, wherein the at least one infeed guiding wheel and the at least one exit guiding wheel are each arranged on sides of the processing conveyor portion opposite the processing tools.

19. The arrangement according to claim 18, wherein both the infeed guiding wheel and the exit guiding wheel are configured, by controlled movement, to increase the contact angle region to a maximum of 270°.

20. The arrangement according to claim 1, further comprising at least one cooling device for cooling the poultry, wherein the cooling device comprises;
  an entry station for handover of the poultry to a first continuous cooling line;
  a measuring device for detecting at least one measured parameter relevant for a cooling holding period for the poultry;
  at least one second continuous cooling line which is connected to the first continuous cooling line by means of a transfer station for controllable handover of the poultry from the first continuous cooling line to the second continuous cooling line;
  further handover stations arranged on the first continuous cooling line and on the least one second continuous cooling line for controllable handover of the poultry to a further downstream processing station; and
  a cooling device control system which is configured, on the basis of the measured parameter relevant for the cooling holding period, to determine the necessary cooling conveyor path for each poultry body and activate the transfer station and the further handover stations accordingly, so that the respective poultry body passes along the necessary cooling conveyor path.

21. The arrangement according to claim 20, wherein the measuring device is a weighing device for detecting individual weights, and/or a poultry temperature measuring device for detecting poultry temperature, which are configured to detect the individual weights and/or the poultry temperature, respectively, as the measured parameter relevant for the cooling holding period.

22. The arrangement according to claim 1, wherein the conveying speed is at least substantially constant.

23. A method for processing poultry, comprising;
  conveying the poultry with a predefined conveying speed by means of an
  overhead
    conveying device which forms a conveying line and is configured to convey the poultry suspended by legs of the poultry, wherein a plurality of processing stations is arranged along the conveying line, and the conveying line has processing conveying portions at each of the processing stations for processing the poultry; and
  controlling adjustment of at least two processing portion lengths of each of the processing conveying portions.

24. The method according to claim 23, wherein the processing portion lengths of the processing conveying portions are adjusted by means of a control device during operation.

25. The method according to claim 24, wherein on a change of one of the processing portion lengths, other of the processing portions lengths are adapted and adjusted by means of the control device on the basis of predefined nominal portion lengths.

26. The method according to claim 24, wherein the plurality of processing stations comprise at least one stunning station for stunning the poultry, a slaughtering station for opening the jugular vein and for bleeding the poultry, and a scalding station for scalding the poultry.

27. The method according to claim 26, wherein the overhead conveying device is a rotating continuous conveyor.

28. The method according to claim 27, wherein the variable length processing portions of the stunning station, the slaughtering station, and/or the scalding station are each formed by at least two deflecting elements, around which a conveying chain of the overhead conveyor runs at least partially, and at least one of the deflecting elements is moved for controllable modification of the processing portion length.

29. The method according to claim 28, wherein compensation is provided by means of a compensation device for a change in an overall length of the conveyor line caused by a change in the processing portion lengths.

30. The method according to claim 29, wherein the compensation device comprises a deflecting element configured as a compensation line deflecting element, and thus forms a variable length compensation line for receiving the conveying chain, wherein the position of the compensation line deflecting element is varied for controllable change of the compensation line length.

31. The method according to claim 30, wherein control of the compensation device is provided by means of the control device such that the compensation line length corresponds to a sum of the changes of the processing portion lengths.

32. The method according to claim 26, wherein the stunning station, the slaughtering station and the scalding station each have length dimensions which are greater than the respective processing conveyor portions.

33. The method according to claim 24, wherein the plurality of processing stations comprise a defeathering station for defeathering the poultry, wherein a plurality of defeathering tool groups is arranged along the processing conveyor portion of the defeathering station, wherein the defeathering tools are controlled such that they come into processing contact with the poultry in predefined contact portions of the processing conveyor portion.

34. The method according to claim 33, wherein to change the processing portion length of the defeathering station, the defeathering tool groups are configured so as to be activated or deactivated, by individual preselection, by means of the control device.

35. The method according to claim 33, wherein to change the processing portion length of the defeathering station, a tool spacing of at least one of the defeathering tool groups is changed by means of the control device.

36. The method according to claim 24, wherein the plurality of processing stations comprise at least one gutting station for removing the internal organs from the poultry, further comprising processing tools each arranged on a carousel-type tool carrier, and the processing conveyor portion of the conveyor line of the at least one gutting station is accordingly arcuate, wherein the processing portion length is adjusted by means of the control device by controlled changing of infeed and/or exit positions of the processing conveyor portion at the carousel-type tool carrier.

37. The method according to claim 36, wherein the infeed and/or exit positions are controlled by movement of guiding elements by the control device.

38. The method according to claim 37, wherein the guiding elements each comprise at least one infeed guiding wheel and at least one exit guiding wheel which are arranged so as to be controlledly movable.

39. The method according to claim 38, wherein the processing conveyor portion surrounds the processing tools at the carousel-type tool carrier in arcuate fashion over a contact angle region of at least 180°.

40. The method according to claim 39, wherein the at least one infeed guiding wheel and the at least one exit guiding wheel are each arranged on sides of the processing conveyor portion opposite the processing tools.

41. The method according to claim 40, wherein the contact angle region is increased to a maximum of 270° by controlled movement of the infeed guiding wheel and exit guiding wheel.

42. The method according to claim 23, further comprising the steps:
    cooling of the poultry by means of a cooling device;
    handover of the poultry by means of an entry station to a first continuous cooling line;
    detection of at least one measured parameter relevant for the cooling holding period of the poultry by means of a measurement device;
    wherein the cooling device comprises at least one second continuous cooling line which is connected to the first continuous cooling line by means of a transfer station for controllable handover of the poultry from the first continuous cooling line to the second continuous cooling line; and wherein
    further handover stations are arranged on the first continuous cooling line and on the least second continuous cooling line for controllable handover of the poultry to a further downstream processing station; and
    determination of a cooling conveyor path necessary for each poultry body on the basis of the measured parameter relevant for the cooling holding period, and corresponding control of the transfer station and the further handover stations, such that the respective poultry body passes along the necessary cooling conveyor path.

43. The method according to claim 42, wherein as measured parameters relevant for the cooling holding period, individual weights are determined by means of a weighing device and/or the poultry temperature is determined by means of a poultry temperature measuring device.

44. The method according to claim 23, wherein the conveying speed is at least substantially constant.

* * * * *

UNITED STATES PATENT AND TRADEMARK OFFICE
CERTIFICATE OF CORRECTION

PATENT NO. : 11,871,757 B2
APPLICATION NO. : 16/959825
DATED : January 16, 2024
INVENTOR(S) : Karsten Nielsen and Poul Kjeldsen It is certified that error appears in the above-identified patent and that said Letters Patent is hereby corrected as shown below:

On the Title Page

Please replace:
(71) Applicant: LINCO FOOD SYSTEMS A/S, Trige (DK)
With:
(71) Applicant: BAADER FOOD SYSTEMS DENMARK A/S, Trige (DK)

And

Please replace:
(73) Assignee: LINCO FOOD SYSTEMS A/S, Trige (DK)
With:
(73) Assignee: BAADER FOOD SYSTEMS DENMARK A/S, Trige (DK)

Signed and Sealed this
Twentieth Day of August, 2024

Katherine Kelly Vidal
*Director of the United States Patent and Trademark Office*